United States Patent [19]
Shimizu et al.

[11] Patent Number: 5,764,015
[45] Date of Patent: Jun. 9, 1998

[54] AUTOMATIC DRIVING APPARATUS

[75] Inventors: Yasuo Shimizu; Tsunehiko Fukatsu, both of Wako, Japan

[73] Assignee: Honda Giken Kogyo Kabushiki Kaisha, Tokyo, Japan

[21] Appl. No.: 703,823

[22] Filed: Aug. 27, 1996

[30] Foreign Application Priority Data

Sep. 4, 1995 [JP] Japan .................. 7-226881

[51] Int. Cl.⁶ .................. B62D 1/00; B62D 5/04; G06F 15/50
[52] U.S. Cl. .................. 318/587; 318/568.1; 318/139; 180/79.1; 180/142
[58] Field of Search .................. 318/139, 560–587; 901/1, 3; 180/142, 160–170, 79.1, 141; 395/80–90; 364/424.02–424.06, 443, 449

[56] References Cited

U.S. PATENT DOCUMENTS

| | | | |
|---|---|---|---|
| 4,500,970 | 2/1985 | Daemmer | 364/513 |
| 4,674,587 | 6/1987 | Suzuki et al. | 180/142 |
| 4,716,981 | 1/1988 | Murao | 180/79.1 |
| 4,735,274 | 4/1988 | Good et al. | 180/204 |
| 4,747,055 | 5/1988 | Eto et al. | 364/424 |
| 4,931,930 | 6/1990 | Shyu et al. | 364/424.01 |
| 4,954,957 | 9/1990 | Kawagoe et al. | 364/424.05 |
| 5,079,706 | 1/1992 | Yamaguchi et al. | 364/424.02 |
| 5,343,393 | 8/1994 | Hirano et al. | 364/424.05 |
| 5,465,210 | 11/1995 | Walenty | 364/424.05 |
| 5,482,129 | 1/1996 | Shimizu | 180/79.1 |
| 5,544,087 | 8/1996 | Nakajima et al. | 364/443 |

FOREIGN PATENT DOCUMENTS 2115182  9/1983  United Kingdom.

*Primary Examiner*—Paul Ip
*Attorney, Agent, or Firm*—Merchant, Gould, Smith, Edell, Welter & Schmidt, P.A.

[57] ABSTRACT

In an automatic driving apparatus, a storage unit is responsive to a storing mode signal for storing as model driving data steering and running states of the vehicle corresponding to elapsed time in a storing mode. In response to an automatic driving mode signal, a setting unit compares the steering and running states stored in the storage unit and steering and running states of the vehicle detected in an automatic driving mode so as to set at least one automatic steering state data. In the automatic driving mode, the model driving data stored in the storage unit can be reproduced with the vehicle's steering system set to an automatically operating state, and the vehicle can be steered automatically in accordance with the model driving data, so that highly convenient, efficient and reliable automatic driving are achieved in automatic garaging of the vehicle etc. with a simple structure that would otherwise require high-level skill of the vehicle driver. The apparatus further includes an electric power steering apparatus that is used for controlling steering of the vehicle on the basis of the automatic steering state data supplied by the setting unit. The use of the electric power steering apparatus substantially simplifies the structure of the automatic driving apparatus.

8 Claims, 11 Drawing Sheets

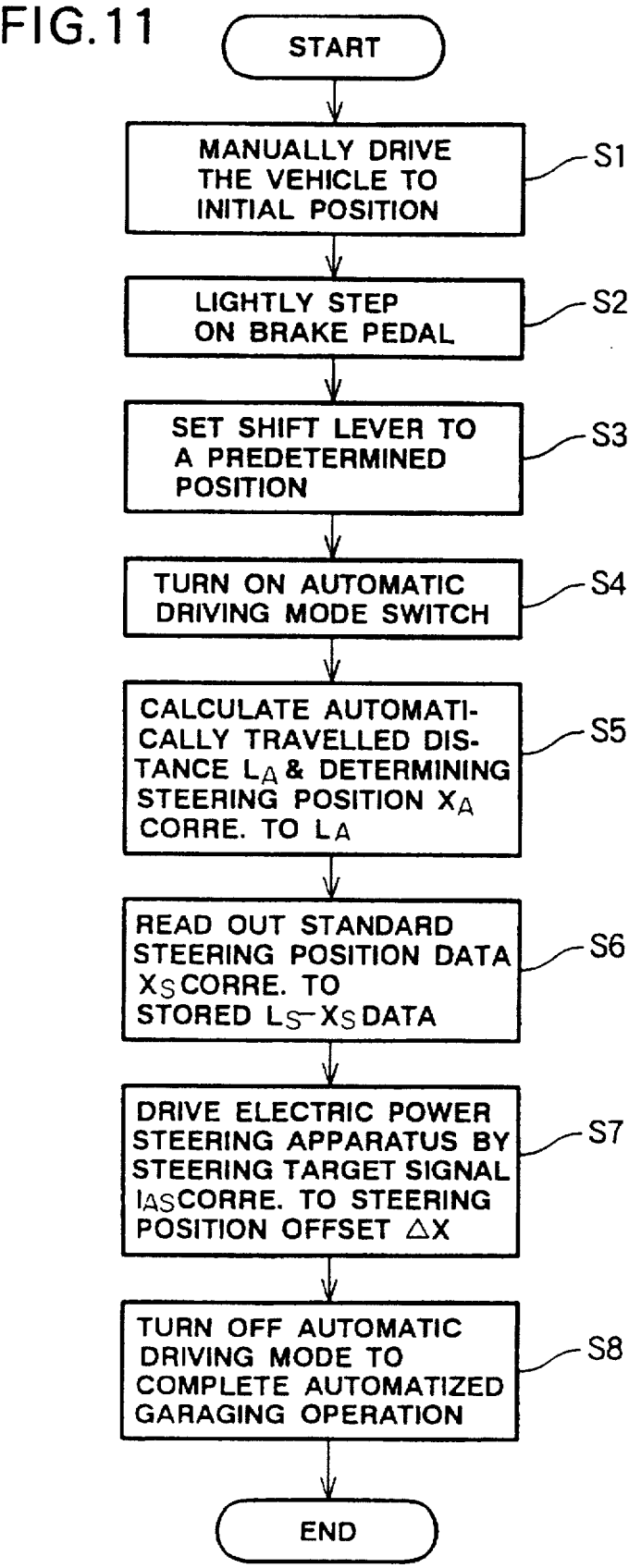

AUTOMATIC DRIVING APPARATUS

BACKGROUND OF THE INVENTION

1. Field of the Invention

The present invention relates to an automatic driving apparatus suitable for use in automotive vehicles, especially motor cars of the the automatic transmission (AT) type, which employ an electric power steering apparatus.

2. Description of the Related Art

Unlike normal steering for driving an automotive vehicle, such as a motor car, on relatively wide roadways, steering operation for garaging or parking an automotive vehicle between narrowly spaced-apart other vehicles in tandem may be troublesome even for experienced drivers and is particularly difficult for inexperienced or novice drivers who have just acquired a driving license. Also, driving an automotive vehicle on a usual road (hence familiar to the driver) may sometimes involve troublesome steering operation if, for example, the road is very narrow or dark at night. In order to eliminate such steering troubles and difficulties, there was a demand for an automotive vehicle provided with an automatic driving apparatus that affords an automatic steering function when needed.

To meet this demand, there have been developed automotive vehicles including an automatic driving apparatus that provides automated steering operation, although the automatic driving apparatus is applicable only where the vehicle is driven on a predetermined course rather slowly.

Some of the conventionally-known automatic driving apparatuses employ high-performance sensors like a television camera or a sonar and subject the sensor outputs to sophisticated signal processing, such as image processing, and complicated control. However, the known automatic driving apparatuses have a significant problem that they would involve high costs because of the high-performance sensors and sophisticated signal processing and control. In addition, because the known automatic driving apparatuses are fully automated, sensors and controllers to afford a complete fail-safe function would unavoidably become large-scale, which makes it difficult to put the apparatuses into practical use at reasonable costs.

SUMMARY OF THE INVENTION

It is therefore an object of the present invention to provide an automatic driving apparatus for an automotive vehicle which achieves highly convenient, efficient and reliable automatic driving with a simple structure.

In order to accomplish the above-mentioned object, the present invention provides an automatic driving apparatus for an automotive vehicle which comprises a storage unit, in response to a storing mode signal for setting a storing mode of the vehicle, for storing as model driving data steering and running states of the vehicle corresponding to elapsed time in the storing mode, and a setting unit, in response to an automatic driving mode signal for setting an automatic driving mode of the vehicle, for comparing the steering and running states stored in the storage unit and steering and running states of the vehicle detected in the automatic driving mode for each predetermined time point so as to set at least one automatic steering state data. Thus, in the automatic driving mode, the model driving data stored in the storing mode can be reproduced with the steering system of the vehicle placed in an automatically operating state, and the vehicle can be steered automatically in accordance with the model driving data, with the result that the automatic driving apparatus achieves highly convenient, efficient and reliable automatic driving with a simple structure, particularly in automatic garaging or parking of the vehicle between narrowly spaced-apart other vehicles in tandem (hereinafter referred to as "narrow tandem parking") that would otherwise require high-level skill of the vehicle driver.

Most preferably, the automatic driving apparatus further comprises an electric power steering apparatus for controlling steering of the vehicle on the basis of the automatic steering state data supplied by the setting unit. The use of the electric power steering apparatus even further simplifies the structure of the automatic driving apparatus.

Preferably, the storage unit includes a travelled-distance calculating section that is responsive to the storing mode signal for calculating a travelled distance of the vehicle, as the running state, on the basis of a velocity of the vehicle and elapsed time measured in the storing mode, and a steering data storing section for storing a standard steering position or standard steering angle as the steering state in correspondence with the travelled distance calculated by the travelled-distance calculating section. Thus, in the storing mode, there are stored steering positions and travelled distances of the vehicle, corresponding to the elapsed time since the initiation of the storing mode, as an experienced driver manually executes garaging or "narrow tandem parking" of the vehicle, and the thus-stored steering positions can be set as model driving data to be later retrieved for use in automatic driving.

The setting unit preferably includes an automatically-travelled-distance calculating section that is responsive to the automatic driving mode signal for calculating an automatically travelled distance of the vehicle on the basis of the velocity and elapsed time, a data accessing section for reading out from the steering data storing section the standard steering position or standard steering angle that corresponds to the automatically travelled distance calculated by the automatically-travelled-distance calculating section, and a steering target signal determining section for determining a steering target signal on the basis of an offset between the standard steering position or standard steering angle read out by the data accessing section and a steering position or steering angle detected in the automatic driving mode. Thus, the electric power steering apparatus in the driving apparatus is driven by the steering target signal determined by the determining section. This allows the model driving data stored in the storing mode to be accurately reproduced for use in automatic steering via the electric power steering apparatus.

Preferably, the storing mode signal is generated by a storing mode switch for setting the storing mode, and the automatic driving mode signal is generated by an AND section for computing an AND condition among a signal generated by an automatic mode switch for setting the automatic driving mode, a signal indicating that a brake pedal has been stepped on and a signal indicating that there is a match between shift lever positions in the storing and automatic driving modes. In this arrangement, the storing mode can be set very simply, while the automatic driving mode can be set only through very complicated operation based on the driver's positive intention so as to prevent the automatic driving mode from being set by mistake or by accident.

Preferably, the automatic driving apparatus further comprises a deactivating section for deactivating the automatic driving mode when a vehicle velocity signal from a vehicle velocity sensor, a steering torque signal from a steering torque sensor, or a steering position signal from a steering position sensor or steering angle signal from a steering angle sensor exceeds a predetermined value. This arrangement provides a reliable fail-safe feature.

The automatic driving apparatus may further comprise a display section that is responsive to the storing mode signal or automatic driving mode signal for informing various states in the storing or automatic driving mode. Thus, the driver can always know what is actually going on in the storing or automatic driving mode.

Preferably, in the automatic driving apparatus, the steering target signal output from the setting unit is supplied to an offset determining section that constitutes a control unit of the electric power steering apparatus, so as to effect automatic steering in the automatic driving mode on the basis of an offset between the steering target signal and a motor current signal indicative of a current flowing in the electric motor of the vehicle. This arrangement provides simplified control and enhanced reliability of the automatic driving apparatus.

BRIEF DESCRIPTION OF THE DRAWINGS

The above and other objects, advantages and features of the present invention will become apparent from the following detailed description of the preferred embodiments when read in conjunction with the accompanying drawings, in which:

FIG. 11 is a flowchart illustrating the garaging operation of the automatic driving apparatus of FIG. 1 in an automatic driving mode.

DETAILED DESCRIPTION OF THE PREFERRED EMBODIMENTS

The present invention provides an automatic driving apparatus which permits automatic garaging or parking of an automotive vehicle, such as a motor car, between narrowly spaced-apart other vehicles in tandem ("narrow tandem parking"), by prestoring data on exemplary or model driving of the vehicle detected as an experienced driver manually executes such garaging or narrow tandem parking in an appropriate manner and then retrieving the stored model driving data so as to permit automatic steering of the vehicle when the garaging or narrow tandem parking of the car is to be done.

Figure 1:
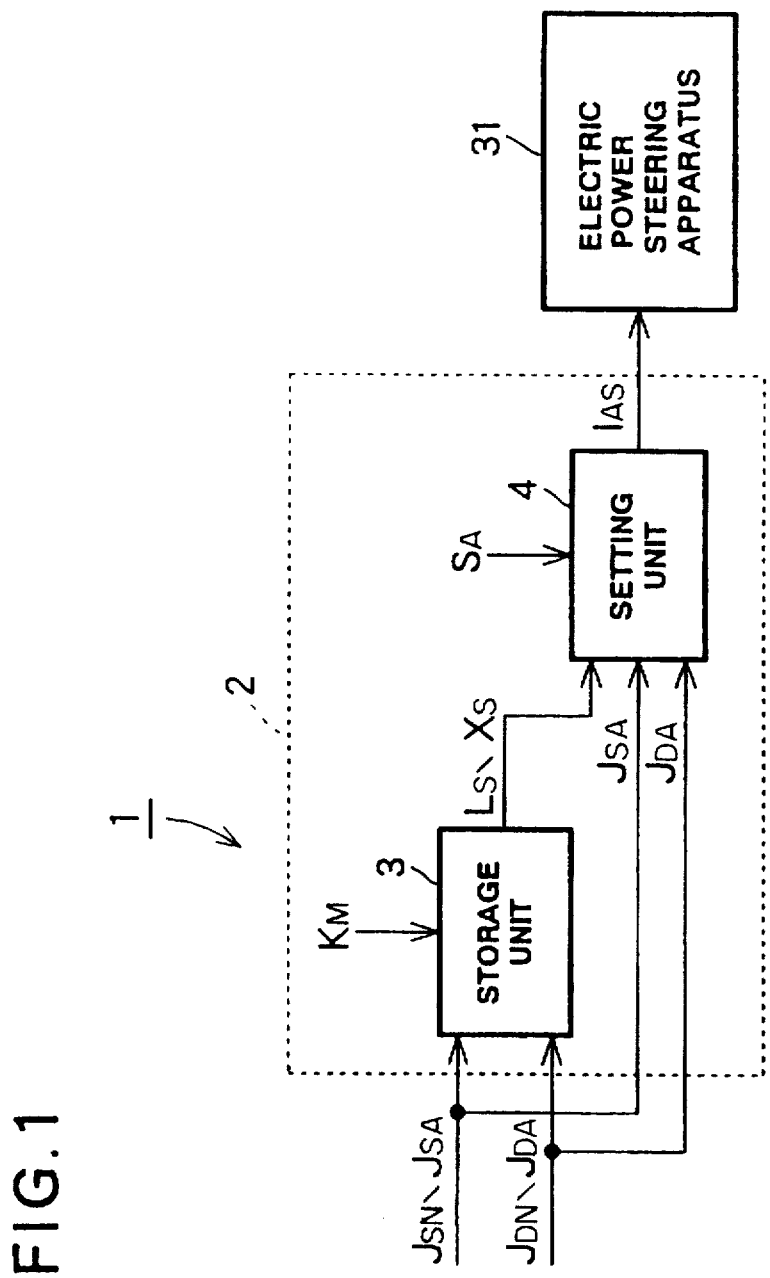
FIG. 1 is a block diagram illustrating a basic structure of an automatic driving apparatus for an automotive vehicle according to an embodiment of the present invention.

FIG. 1 is a block diagram illustrating a basic structure of the automatic driving apparatus 1 according to a preferred embodiment of the present invention, which comprises an automatic driving controller unit 2 including a storage unit 3 and a setting unit 4, and an electric power steering apparatus 31.

The storage unit 3 of the automatic driving controller unit 2 includes a timer section, an arithmetic section, a processing section and a storing section as will be later described. In response to storing mode signal $K_M$ for setting a storing mode, the storage unit 3 receives steering state data $J_{SN}$ (such as steering position data $X_S$, steering angle data $\theta_S$ or steering torque data $T_S$) indicative of steering states of the vehicle corresponding to elapsed time since initiation of the storing mode, as well as running state data $J_{DN}$ (such as vehicle velocity data $V_S$ and shift lever position data $P_S$), as an experienced vehicle driver garages or parks the vehicle between narrowly spaced-apart other vehicles in tandem. The storage unit 3 subjects the received steering and running state data $J_{SN}$ and $J_{DN}$ to arithmetic and other processing, to thereby store data necessary for automatic driving of the vehicle.

For example, the storage unit 3 multiplies the running state data $J_{DN}$ (e.g., vehicle velocity data $V_S$) by timer data $T\tau$ to calculate a distance travelled by the vehicle (vehicle's travelled distance $L_S = V_S \times T\tau$) and stores the thus-calculated vehicle's travelled distance $L_S$ in correspondence with the steering state data $J_{SN}$ (e.g., target steering position data $X_S$ or target steering angle data $\theta_S$) corresponding to the elapsed time (timer data $T\tau$). In this way, time-varying vehicle's-travelled-distance $L_S$ vs. target-steering-position $X_S$ (or steering-angle $\theta_S$) characteristic data are stored in the storage unit 3 as model driving data.

The setting unit 4 of the automatic driving controller unit 2 includes a timer, an arithmetic section, a processing section, a data accessing section and a storing section. In response to automatic driving mode signal $S_A$ for setting an automatic driving mode, the setting unit 4 receives steering state data $J_{SA}$ (such as steering position data $X_A$ or steering angle data $\theta_A$) indicative of steering states of the vehicle corresponding to elapsed time since initiation of the automatic driving mode, as well as running state data $J_{DA}$ (such as vehicle velocity data $V_A$ and shift lever position data $P_A$). Then, the setting unit 4 subjects the received steering and running data $J_{SA}$ and $J_{DA}$ to arithmetic and other processing and compares the resultant processed data with the data previously stored in the storage unit 3, to thereby set at least one of steering state data $J_{SN}$ (e.g., target steering position data $X_S$ or target steering angle data $\theta_S$) essential to automatic driving of the vehicle. Consequently, the setting unit 4 supplies the electric power steering apparatus 31 with driving control information (such as steering target signal $I_{AS}$) corresponding to the thus-set steering state data $J_{SN}$.

For example, the setting unit 4 multiplies the value of the running state data $J_{DA}$ (e.g., vehicle velocity data $V_A$) by the value of the timer data $T_A$ to calculate a distance automatically covered or travelled by the vehicle (i.e., vehicle's automatically travelled distance $L_A=V_A \times T_A$). Then, the setting unit 4 reads out, from among the vehicle's-travelled-distance $L_S$ vs. steering-position-data $X_S$ (or steering-angle-data $\theta_S$) characteristic data stored in the storage unit 3, target steering position data $X_S$ (or target steering angle data $\theta_S$) corresponding to the vehicle's automatically travelled distance $L_A$ (=vehicle's travelled distance $L_S$). Following this, the setting unit 4 generates offset signal $\Delta X$ or $\Delta\theta$ by calculating an offset between the target steering position data $X_S$ or target steering angle data $\theta_S$, and steering position data $X_A$ or steering angle data $\theta_A$ corresponding to the automatically travelled distance $L_A$ and steering target signal $I_{AS}$ based on the offset signal $\Delta X$ or $\Delta\theta$. The steering target signal $I_{AS}$ is then supplied to the electric power steering apparatus 31 to effect automatic steering in the automatic driving mode.

The electric power steering apparatus 31 drives a built-in engine of the vehicle in response to the steering target signal $I_{AS}$ to give assistance to a steering system of the vehicle. Thus, the electric power steering apparatus 31 is able to control the automatic steering of the vehicle in accordance with the model driving data previously stored by the controller unit 2 in the storing mode.

As mentioned above, the automatic driving apparatus 1 is arranged to prestore vehicle's-travelled-distance $L_S$ vs. target-steering-position $X_S$ (or steering-angle $\theta_S$) characteristic data in response to storing mode signal $K_M$, and in response to automatic driving mode signal $S_A$, read out from the storage unit 3 target steering position data $X_S$ (or target steering angle data $\theta_S$) corresponding to a vehicle's automatically travelled distance $L_A$ detected in the automatic driving mode. Thus, on the basis of the target steering position data $X_S$ (or target steering angle data $\theta_S$), the automatic driving apparatus 1 automatically operates the steering system to permit automatic driving of the vehicle in accordance with the model driving data previously stored by the controller unit 2 in the storing mode.

Figure 2:
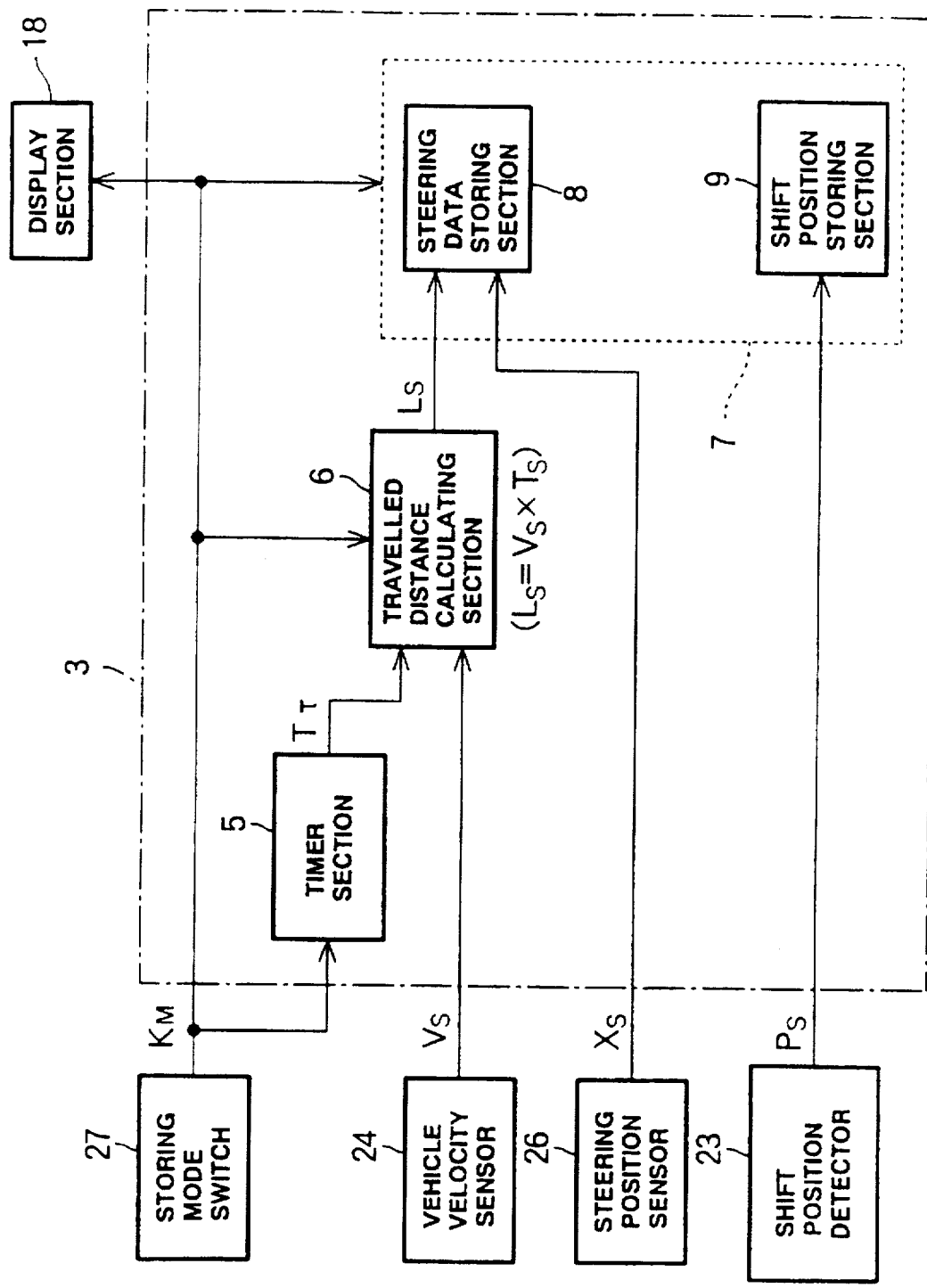
FIG. 2 is a block diagram illustrating principal components of a storage unit of the automatic driving apparatus shown in FIG. 1.

FIG. 2 is a block diagram illustrating principal components of the storage unit 3 of the automatic driving apparatus 1 shown in FIG. 1, which includes a timer section 5, travelled distance calculating section 6 and a data storing section 7 having a steering data storing section 8 and a shift position storing section 9. This embodiment will be described on the assumption that steering position data $X_S$ is used as steering state data $J_{SN}$.

The timer section 5, which is provided with a timer circuit or similar software-controlled timer function, starts counting elapsed time in response to storing mode signal $K_M$ (e.g., of high level) generated when a storing mode switch 27 is turned on by the driver to activate the storing mode, so that the timer section 5 supplies timer data $T\tau$ to the travelled distance calculating section 6 and also monitors steering position data $X_S$ output from a steering position sensor 26 corresponding to timer data $T\tau$.

The storing mode switch 27 is accommodated, along with a later-described automatic driving mode switch 21 (FIG. 4), in a covered case disposed in the vehicle compartment near the driver's seat, so as to prevent the driver from operating the switches 27 and 21 by mistake during normal driving. The storing mode switch 27 also supplies the storing mode signal $K_M$ to the travelled distance calculating section 6, data storing section 7 and a display section 18 provided on a front panel in the vehicle compartment, to activate these sections 6, 7 and 18.

The travelled distance calculating section 6, which is provided with a multiplier or similar software-controlled multiplying function, calculates travelled distance $L_S$ by multiplying the value of vehicle velocity data $V_S$ detected via a vehicle velocity sensor 24 by the value of timer data $T\tau$ ($L_S=V_S \times T\tau$) and sends the calculated travelled distance $L_S$ to the steering data storing section 8.

In response to the storing mode signal $K_M$, the steering data storing section 8, comprising a rewritable memory such as a RAM, stores the value of travelled distance signal $L_S$ from the travelled distance calculating section 6 in correspondence with steering position data $X_S$, corresponding to the distance $L_S$, output from the steering position sensor 26 for each timer data $T\tau$.

Shift position detector 23 detects a shift lever position in the case where the vehicle is of the AT type. The shift position storing section 9 comprises a rewritable memory such as a RAM like the steering data storing section 8, and in response to the storing mode signal $K_M$, this section 9 stores shift position lever data $P_S$ output from the shift position detector 23.

The display section 18 comprises, for example, an audible display such as a speaker or buzzer, or an visual display such as LEDs or LCD (liquid crystal display), and in response to the storing mode signal $K_M$ (e.g., of high level), this display section 18 informs the driver of the current states of the storing mode in sound or characters and pictures.

With the timer section 5, travelled distance calculating section 6 and data storing section 7 having the steering data storing section 8 and shift position storing section 9, the storage unit 3 of the automatic driving apparatus 1 in the storing mode can store, as model driving data, steering positions $X_S$ corresponding to time-varying travelled distances $L_S$ of the vehicle detected as the experienced driver manually executes garaging or narrow tandem parking of the vehicle, so that the stored model driving data (i.e., model driving states) can be retrieved later to automatically set necessary driving conditions of the vehicle for automatic garaging or narrow tandem parking.

The model driving data (steering positions $X_S$ corresponding to time-varying travelled distances $L_S$) can of course be renewed by the driver again manually executing garaging or narrow tandem parking of the vehicle after having activated the storing mode switch 27 again.

Figure 3:
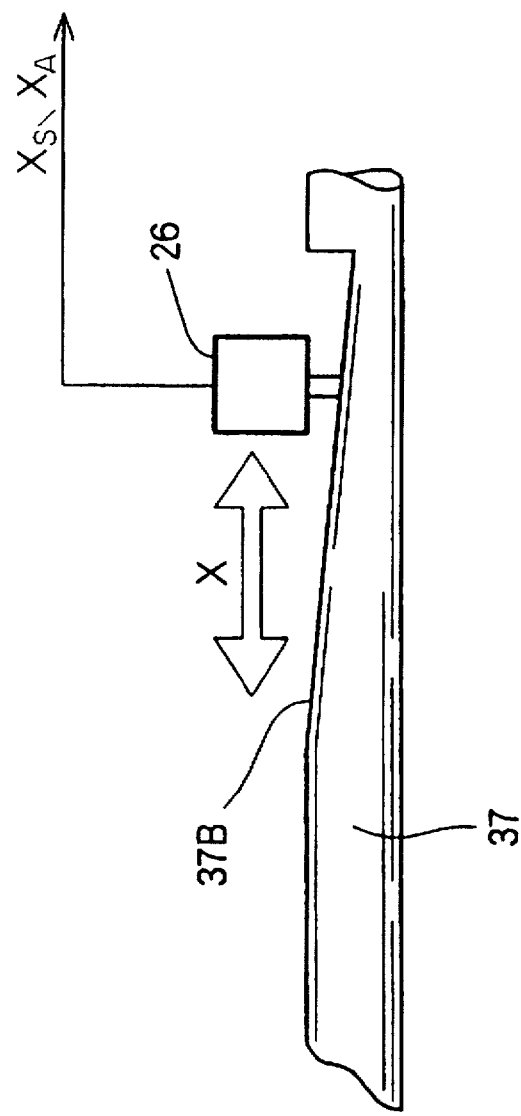
FIG. 3 schematically shows an example of a steering position sensor of the automatic driving apparatus shown in FIG. 1.

FIG. 3 shows an example of the steering position sensor 26 for detecting a current steering position ($X_S$, $X_A$). In FIG. 3, the steering position sensor 26 comprises a potentiometer, which generates steering position data $X_S$, $X_A$ by detecting, as an electrical signal, a current position of a tapering recessed portion 37B that is formed integrally with a rack shaft 37 of the electric power steering apparatus 31.

Figure 4:
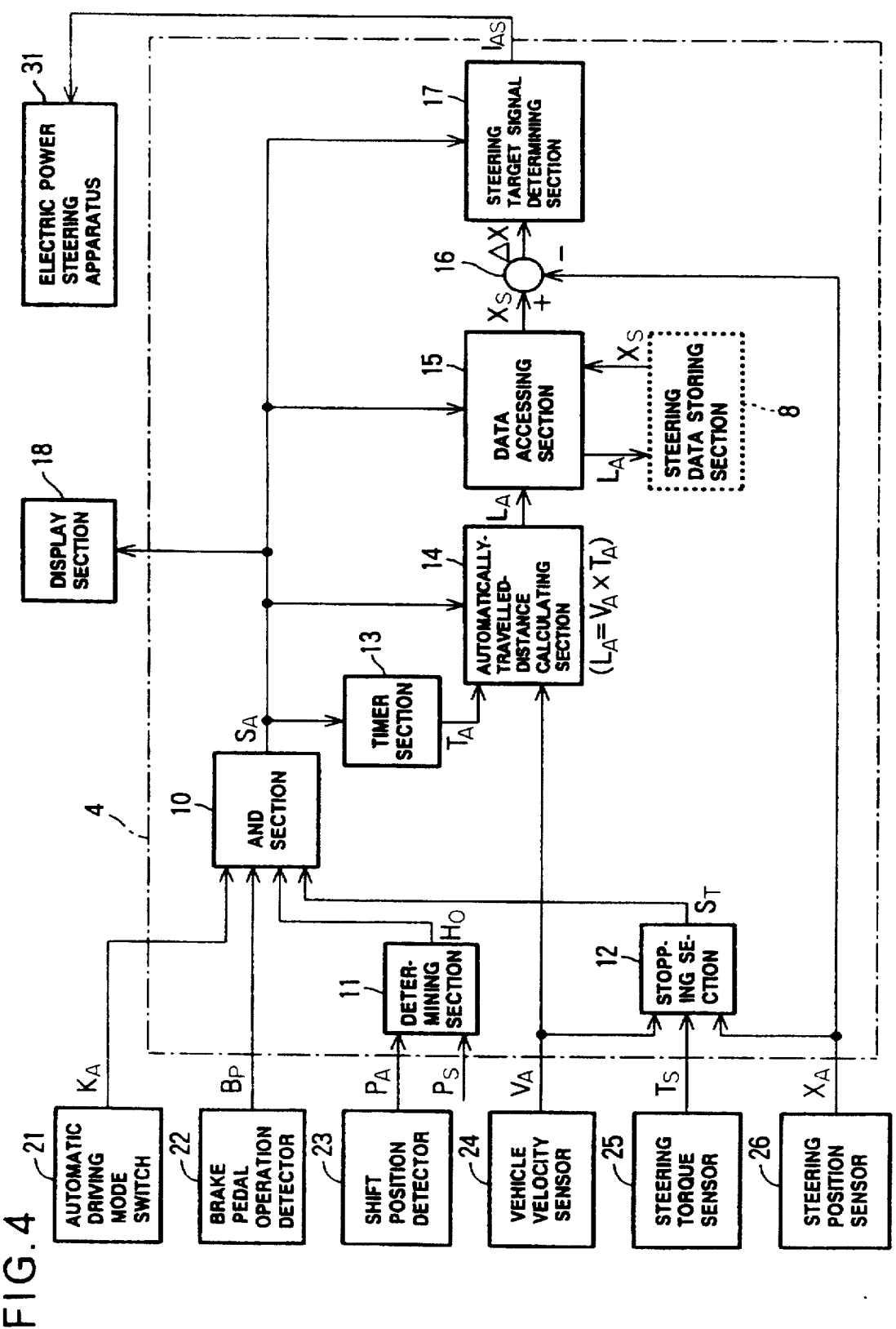
FIG. 4 is a block diagram illustrating principal components of a setting unit of the automatic driving apparatus shown in FIG. 1.

FIG. 4 is a block diagram illustrating principal components of the setting unit 4 of the automatic driving apparatus 1 shown in FIG. 1, which includes an AND section 10, determining section 11, stopping section 12, timer section 13, automatically-travelled-distance calculating section 14, data accessing section 15, offset calculating section 16 and steering target signal determining section 17.

The AND section 10 is provided with a plural-input AND gate or similar software-controlled AND function, and this section 10 determines a logical product (AND) among three input vehicle operation signals: automatic driving mode signal $K_A$ (e.g., of high level) output from the automatic driving mode switch 21 when it is turned on by the driver; brake pedal signal $B_P$ (e.g., of high level) output from a brake pedal operation detector 22 that detects that the vehicle brake does not work despite the driver's stepping-on of the brake pedal; and determination signal $H_O$ output from the determining section 11 when the section 11 determines that there is a match between shift lever position data $P_S$ for the storing mode stored in the shift position storing section 9 and shift lever position data $P_A$ for the automatic driving mode detected by the shift position detector 23. The AND section 10 supplies, as automatic driving mode signal $S_A$, the thus-determined logical product ($K_A*B_P*H_O$) to the timer section 13, automatically-travelled-distance calculating section 14, data accessing section 15 and steering target signal determining section 17 to activate these sections.

The automatic driving mode signal $S_A$ is also sent to the display section 18, which thus informs the driver of the current states of the automatic driving mode in sound or characters and/or pictures. As mentioned earlier, the automatic driving mode switch 21 is accommodated, along with the storing mode switch 27, in the covered case disposed in the vehicle compartment near the driver's seat, so as to prevent the driver from operating the switches 21 and 27 by mistake during normal driving.

The determining section 11, comprising a comparator or similar software-controlled comparing function, compares shift lever position data $P_S$ stored in the shift position storing section 9 of FIG. 2 and shift lever position data $P_A$ for the automatic driving mode detected by the shift position detector 23. When there is a match between the shift lever position data $P_S$ detected as a voltage value of a potentiometer constituting the detector 23 and a voltage value indicated by the shift lever position data $P_A$, the determining section 11 determines that the shift positions are the same (e.g., reverse position) and thus supplies determination signal $H_O$ (high level) to the AND section 10.

The stopping section 12 comprises a plurality of comparators or similar software-controlled comparing function. When vehicle velocity signal $V_A$ output from the vehicle velocity sensor 24, steering torque signal $T_S$ output from a steering torque sensor 25 or steering position signal $X_A$ output from the steering position sensor 26 exceeds corresponding reference vehicle velocity $V_K$, reference steering torque signal $T_K$ or reference steering position signal $X_K$, the stopping section 12 supplies stop signal $S_T$ (e.g., low level) to the AND section 10 to stop or deactivate the automatic driving mode. Specifically, high-level stop signal $S_T$ is normally supplied to the AND section 10, so that in response to the low-level stop signal $S_T$, normally high-level automatic driving mode signal $S_A$ from the AND section 10 is compulsorily set to low level to thereby deactivate the automatic driving mode.

With the thus-arranged stopping section 12, the setting unit 4 can immediately terminate the automatic driving whenever conditions undesirable for the automatic driving are caused by the driver excessively increasing the vehicle velocity or overly turning the steering wheel by mistake or by the steering position exceeding beyond a predetermined limit for some reason.

The timer section 13, which is provided with a timer circuit or similar software-controlled timer function, starts counting elapsed time in response to high-level automatic driving mode signal $S_A$, so that the timer section 13 supplies timer data $T_A$ to the automatically-travelled-distance calculating section 14 and also monitors steering position data $X_A$, corresponding to the timer data $T_A$, output from the steering position sensor 26.

The automatically-travelled-distance calculating section 14, which is provided with a multiplier or similar software-controlled multiplying function, calculates automatically travelled distance $L_A$ by multiplying the value of vehicle velocity data $V_A$ detected via the vehicle velocity sensor 24 by the value of timer data $T_A$ ($L_A=V_A \times T_A$) and sends the calculated travelled distance $L_A$ to the data accessing section 15.

The data accessing section 15 transfers the automatically travelled distance $L_A$ from the calculating section 14 to the steering data storing section 8, so as to read out, from among the vehicle's-travelled-distance $L_S$ vs. steering-position $X_S$ data stored in the steering data storing section 8, steering position data $X_S$ corresponding to the travelled distance $L_S$ of the same value as the vehicle's automatically travelled distance $L_A$ ($L_S=L_A$). Then, the data accessing section 15 supplies the offset calculating section 16 with the read-out steering position data $X_S$ as standard steering position data $X_S$ for the automatically travelled distance $L_A$.

The offset calculating section 16, which comprises a subtracted or similar software-controlled subtracting function, generates steering position offset signal $\Delta X$ by calculating an offset between the standard target steering position data $X_S$ supplied from the data accessing section 15 and steering position data $X_A$ from the steering position sensor 26 ($\Delta X=X_S-X_A$) which is monitored for each timer data $T_A$.

Figure 5:
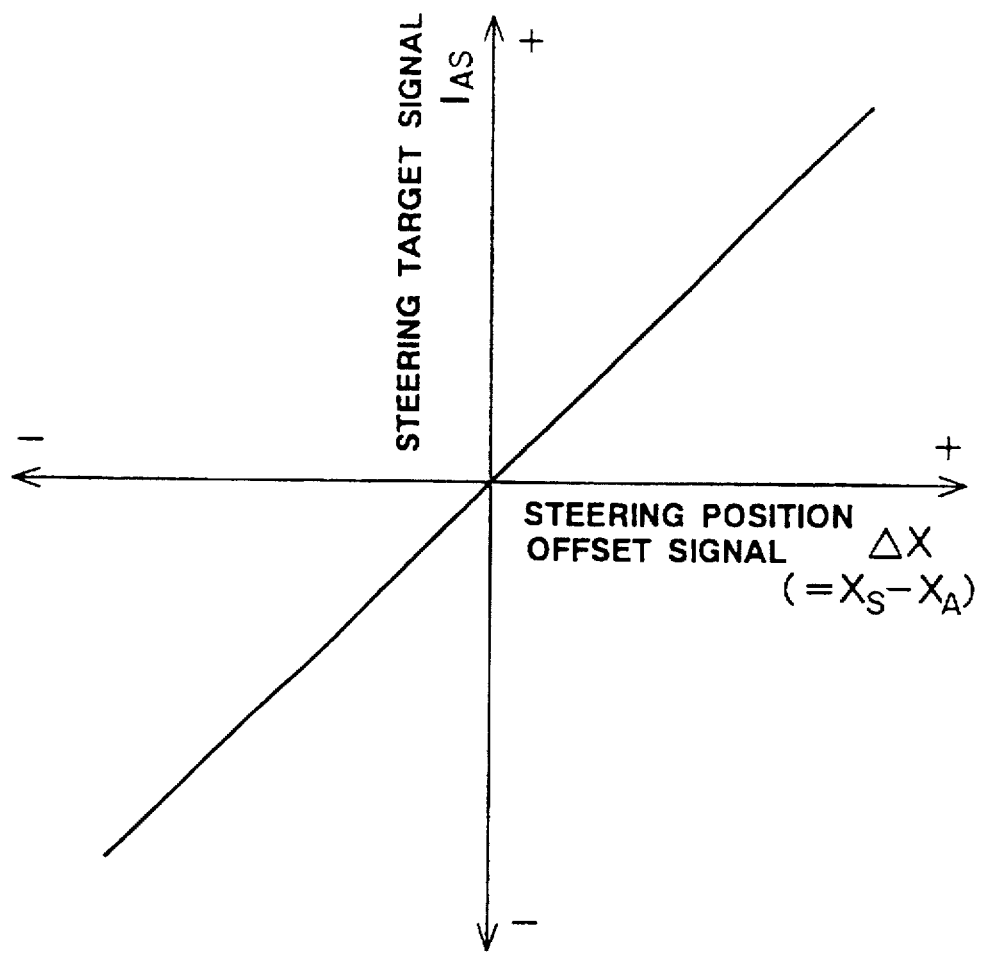
FIG. 5 is a graph of a data table representing a steering-position-offset-signal vs. steering-target-signal characteristic.

The steering target signal determining section 17 includes a memory, such as a ROM, which has prestored therein a data table that represents a steering-position-offset-signal $\Delta X$ vs. steering-target-signal $I_{AS}$ characteristic as shown in FIG. 5 and is set on the basis of values derived from experiments or through arithmetic or logical operations. Using the data table stored in the ROM, the steering target signal determining section 17 supplies the electric power steering apparatus 31 with steering target signal $I_{AS}$ corresponding to the steering position offset signal $\Delta X$ sent from the offset calculating section 16, so as to control automatic steering apparatus in the automatic driving mode.

With the thus-arranged AND section 10, determining section 11, stopping section 12, timer section 13, automatically-travelled-distance calculating section 14, data accessing section 15, offset calculating section 16 and steering target signal determining section 17, the setting unit 4 in the automatic driving mode reads out, from the steering data storing section 8, steering position data $X_S$ corresponding to travelled distance $L_S$, and generates steering target signal $I_{AS}$ to automatically control the steering apparatus 31 on the basis of steering position offset signal $\Delta X$ indicating an offset between standard target steering position data $X_S$ and steering position data $X_A$ corresponding to actual automatically travelled distance $L_A$ of the vehicle. In this manner, the model driving data (i.e., model driving states) can be reproduced for automatic steering of the vehicle when necessary.

In a modified arrangement, a steering angle sensor may be provided, in place of the steering position sensor 26, in connection with the storage unit 3 of FIG. 2 and setting unit 4 of FIG. 4 so that steering angle data $\theta_A$, $\theta_S$ rather than steering position data $X_A$, $X_S$ is set as steering state data.

Figure 6:
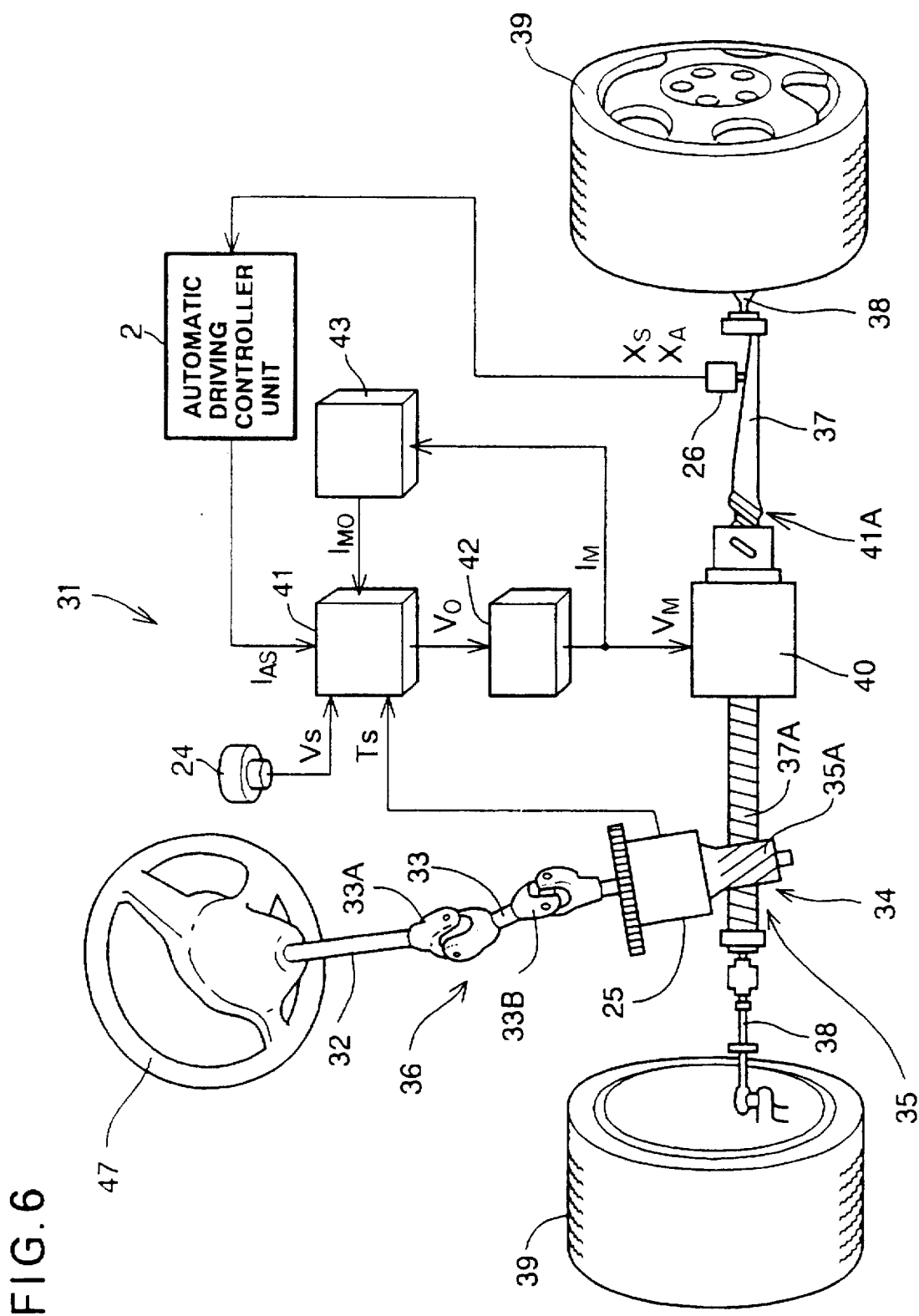
FIG. 6 is a schematic view illustrating a general structure of an electric power steering apparatus employed in the automatic driving apparatus of FIG. 1.

FIG. 6 is a schematic view illustrating a general structure of the electric power steering apparatus 31 of the automatic driving apparatus 1 according to the present invention. As shown, the electric power steering apparatus 31 comprises a manual steering power generating unit 36, which includes a steering shaft 32 that is integrally connected at one end to a steering wheel 47 and connected at the other end to a pinion 35A of a rack and pinion set 35 via a connecting shaft 33 having universal joints 33A and 33B mounted on the opposite ends thereof. The pinion 35A is in meshing engagement with a toothed rack 37A, and a rack shaft 37 reciprocatively movable through the meshing engagement between the pinion 35A and rack 37A is connected at opposite ends to left and right steerable front wheels 39 via tie rods 38. Thus, in response to the driver's steering operation of the steering wheel 47, the front wheels 39 are driven to vary the running direction of the vehicle through the rack-and-pinion-based manual steering power generation unit 36.

In order to reduce the amount of steering power that has to be produced by the manual steering power generation unit 36, an electric motor 40 for supplying a steering assist is connected coaxially with the rack shaft 37, and the supplied steering assist is converted, via a ball thread mechanism 41A also provided coaxially with the rack shaft 37, into thrust that is applied to the rack shaft 37 (ball thread shaft 41A).

The steering torque sensor 25 is contained in a steering gear box 34 and detects a direction and intensity of manual steering power applied by the vehicle driver. Steering torque signal $T_S$ indicative of steering torque detected via the steering torque sensor 25 is supplied to a control unit 41 which will be later described in detail. The vehicle velocity sensor 24 generates vehicle velocity signal $V_S$ in the form of an electrical pulse signal having a frequency corresponding to a current velocity of the vehicle and passes the generated vehicle velocity signal $V_S$ to the control unit 41.

The control unit 41, which comprises a microcomputer, various arithmetic operating sections, a determining section, a switching section and a memory controlled by the microcomputer, generates motor control signal $V_O$ (e.g., a combination of an ON signal and PWM signal) corresponding to steering torque signal $T_S$ so as to controllably drive a motor driving section 42. The control unit 41 also generates motor control signal $V_O$ (e.g., a combination of an ON signal and PWM signal) on the basis of steering target signal $I_{AS}$ supplied from the automatic driving controller unit 2 so as to controllably drive the motor driving section 42 to thereby control the steering apparatus 31 when the vehicle is in the automatic driving mode.

The motor driving section 42 comprises a bridge circuit composed of four switching elements such as FETs (field effect transistors) and generates motor voltage $V_M$ on the basis of motor control signal $V_O$, so that the motor 40 is driven by the motor voltage $V_M$. Motor current detecting section 43 detects motor current $I_M$ and feeds motor current signal $I_{MO}$ indicative of the detected motor current $I_M$ back to the control unit 41 (negative feedback). The steering position sensor 26 comprises a potentiometer provided on the rack shaft 37 and generates steering position data $X_S$, $X_A$ by detecting an amount of displacement of the rack shaft 37 corresponding to an amount of steering operation by the driver (e.g., steering torque $T_S$ or steering angle $\theta_S$), so that the automatic driving controller unit 2 supplies steering target signal $I_{AS}$ to the control unit 41.

Figure 7:
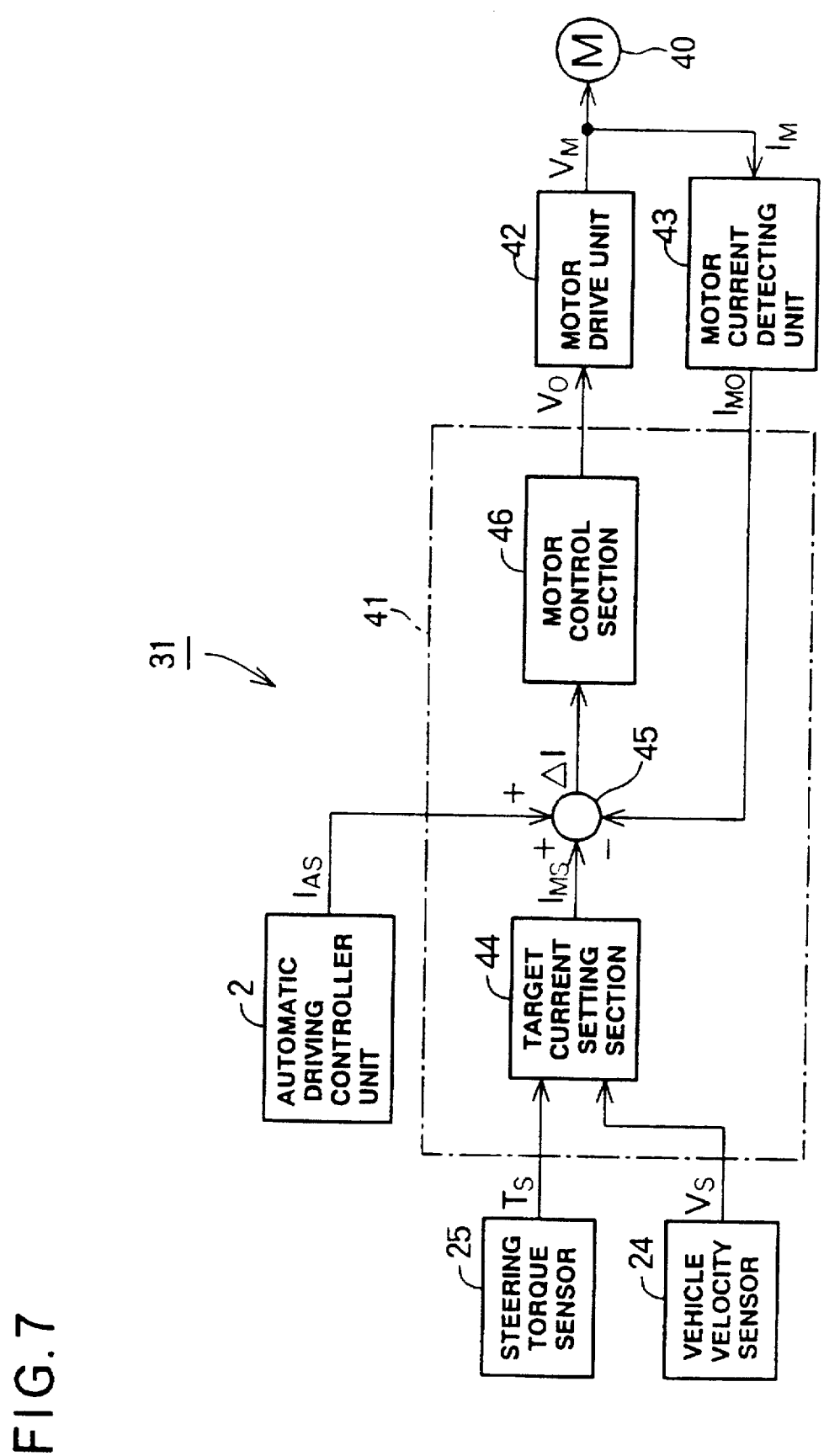
FIG. 7 is a block diagram showing principal components of the electric power steering apparatus of FIG. 6.

FIG. 7 is a block diagram showing principal components of the electric power steering apparatus 31 employed in the automatic driving apparatus 1 according to the present invention. The control unit 41 of the electric power steering apparatus 31 includes a microcomputer, various processing and arithmetic operating sections and a memory controlled by the microcomputer. More specifically, the control unit 41 is connected with the vehicle velocity sensor 24, steering torque sensor 25, controller unit 2, motor current drive unit 42, motor current detecting unit 43 and electric motor 40. The control unit 41 includes a target current setting section 44, an offset determining section 45 and a motor control section 46.

Figure 8:
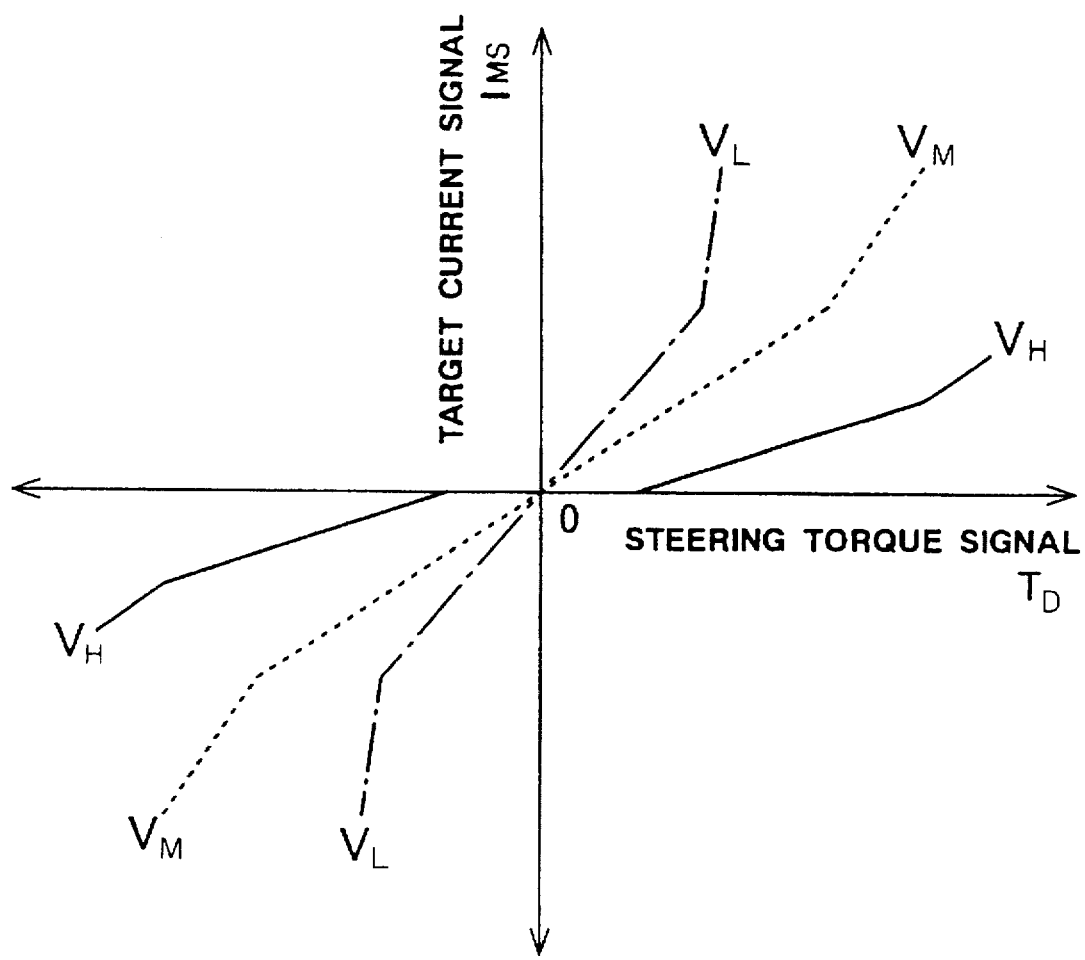
FIG. 8 is a graph representing steering-torque-signal vs. target-current-signal characteristics with vehicle velocity signal used as parameters.

The target current setting section 44 converts analog steering torque signal $T_S$ from the torque sensor 25 and vehicle velocity signal $V_S$ from the velocity sensor 24 into digital form via an A/D converter (not shown), and reads out, from a steering-torque-signal ($T_D$) vs. target-current-signal ($I_{MS}$) characteristic table as shown in FIG. 8 (where vehicle velocity signals $V_S$ ($V_L$, $V_M$ and $V_H$) are used as parameters), one of values of target current signal $I_{MS}$ corresponding to the values of the detected steering torque signal $T_S$ and vehicle velocity signal $V_S$. The read-out target current signal value $I_{MS}$ is passed to the offset determining section 45.

The offset determining section 45 calculates an offset between the target current signal value $I_{MS}$ and motor current signal $I_{MO}$ corresponding to the motor current $I_M$ detected by the motor current detecting section 43 to thereby generate offset signal $\Delta I$ ($=I_{MS}-I_{MO}$). The motor control section 46 converts the offset signal $\Delta I$ into a voltage value and generates motor control signal $V_O$ to control the motor driving section 42 on the basis of a PWM technique such that the offset signal $\Delta I$ is caused to promptly become zero.

In the automatic driving mode, the offset determining section 45 supplies the motor control section 46 with offset signal $\Delta I$ indicative of an offset between steering target signal $I_{AS}$ generated from the automatic driving controller unit 2 and motor current signal $I_{MO}$ corresponding to motor current $I_M$ generated on the basis of the steering target signal $I_{AS}$ and detected by the motor current detecting section 43 ($\Delta I=I_{AS}-I_{MO}$).

The motor control section 46, which includes a PID control section and motor control signal generating section, subjects the offset signal $\Delta I$ ($=I_{MS}-I_{MO}$ or $I_{AS}-I_{MO}$) from the offset determining section 45 to PID (proportional and integral and derivative) control so as to supply the motor driving section 42 with motor control signal $V_O$ (ON/OFF signal and PWM signal) corresponding to the target current signal value $I_{MS}$ or steering target signal $I_{AS}$. In this way, the motor current $I_M$ flowing in the motor 40 is controlled to promptly become equal to the target current signal $I_{MS}$ and steering target signal $I_{AS}$.

Value and direction of motor voltage $V_M$ to be fed to the motor 40 are determined by driving predetermined two pairs of the power FETs of the motor driving section 42 with the motor control signal $V_O$ (ON/OFF signal and PWM signal). The direction of the motor voltage $V_M$ depends on the polarity of the motor control signal $V_O$ output from the motor control section 46.

As mentioned above, the automatic driving apparatus 1 according to the present invention employs the electric power steering apparatus 31 and supplies the control unit 41 with steering target signal $I_{AS}$ generated by the automatic driving controller unit 2 so as to control the motor 40. This arrangement permits automatic steering in the automatic driving mode, by utilizing the essential behavior of the electric power steering apparatus 31.

Figure 9:
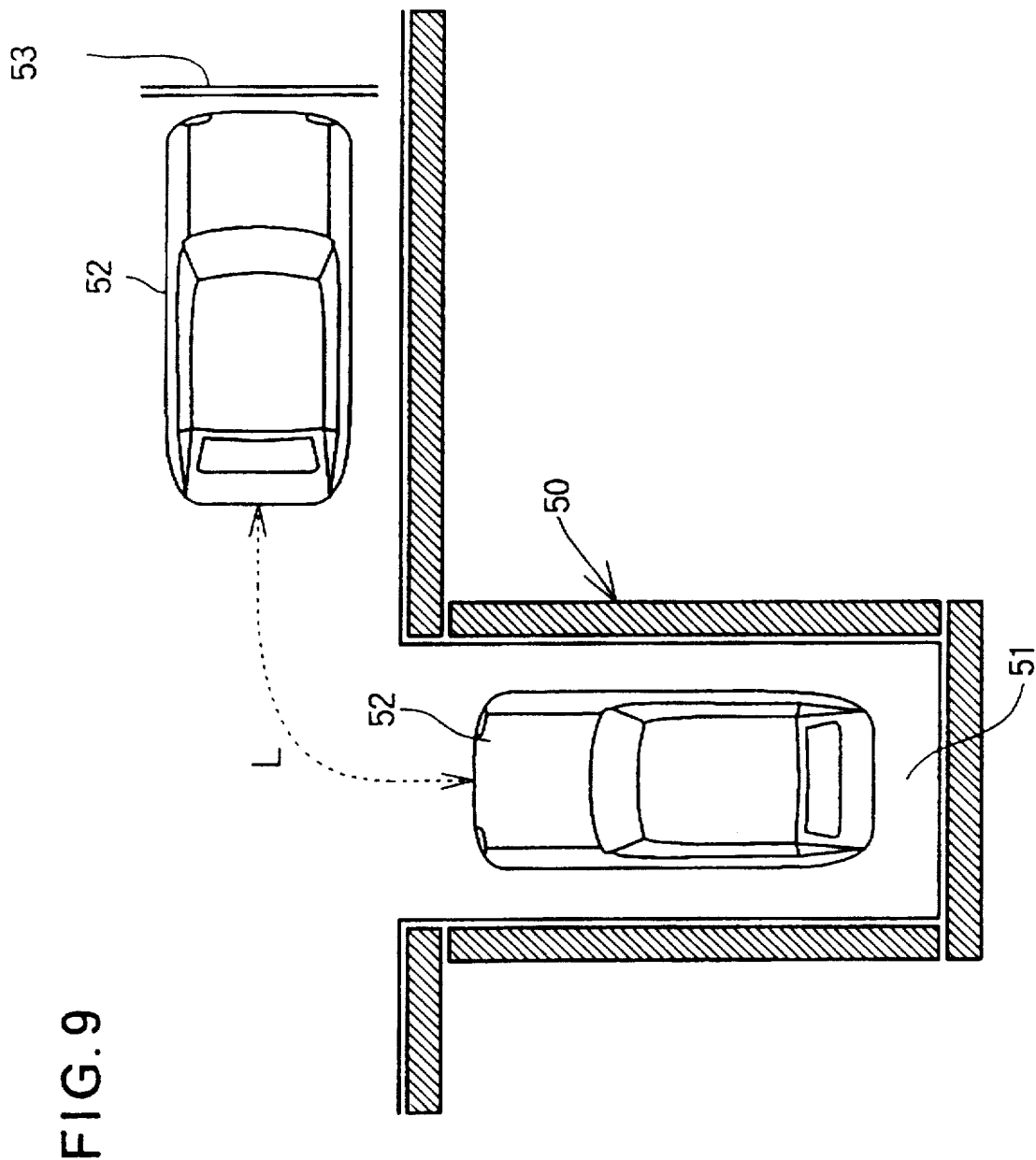
FIG. 9 is a conceptual view showing garaging operation of the automotive vehicle provided with the automatic driving apparatus of FIG. 1.
Figure 10:
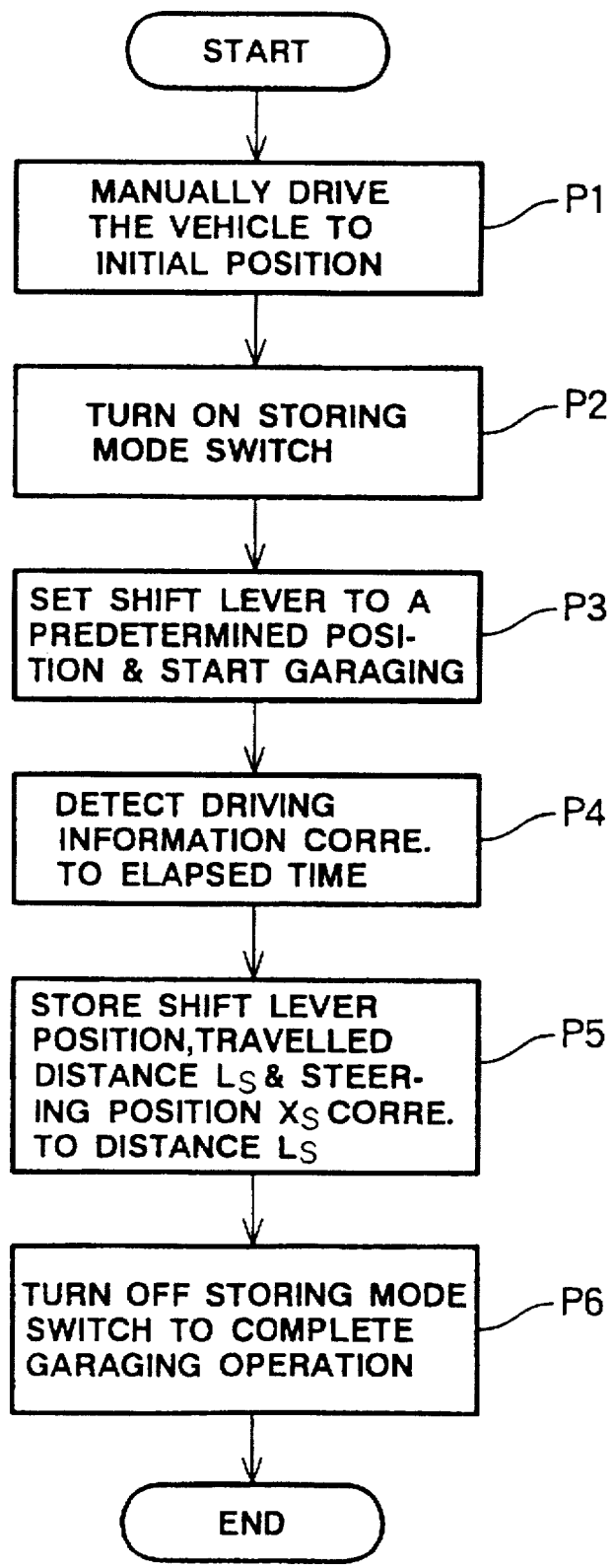
FIG. 10 is a flowchart illustrating the garaging operation of the automatic driving apparatus of FIG. 1 in a storing mode.

With reference to FIGS. 9 to 11, a description will be made below on garaging operation of the automotive vehicle provided with the automatic driving apparatus 1 both in the storing mode and in the automatic driving mode.

FIG. 9 conceptually illustrates how the vehicle 52 is garaged. In FIG. 9, the automotive vehicle 52 in the storing mode is manually put into a parking space 51 of a garage 50 by an experienced driver, for storage of model driving data. Specifically, at that time, the vehicle 52 is first temporarily stopped close to a predetermined initial position 53, then the storing mode switch 27 is turned on to activated the storing mode, and then the vehicle 52 is manually driven backward over an appropriate distance L into the parking space 51 of the garage 50, as shown in FIG. 9.

FIG. 10 is a flowchart illustrating the garaging operation in the storing mode. First, at step P1, the vehicle 52 is manually driven by the driver until the forward end of the vehicle 52 is brought close to and substantially parallel with the initial position line 53.

Once the driver turns on the storing mode switch 27 at step P2 to activate the storing mode, the display section 18 informs, in sound or by displaying or blinking characters and/or pictures, that the vehicle 52 is now in the storing mode. Then, at step P3, the driver sets the shift lever to a predetermined position (e.g., reverse position) and starts manually driving the vehicle backward to put the vehicle 52 into the garage 50. As the vehicle 52 is moved backward, the automatic driving apparatus 1, at step P4, detects driving states such as vehicle velocity $V_S$ and steering position $X_S$ corresponding to time elapsed since the beginning of the backward movement (which is represented by time data Tτ) and calculates travelled distance $L_S$ by multiplying the value of the vehicle velocity $V_S$ by the value of the time data Tτ.

At next step P5, the apparatus 1 stores the driver-set shift lever position $P_S$ (e.g., reverse position), calculated travelled distance $L_S$ and steering position data $X_S$ corresponding to the travelled distance $L_S$. After having been moved backward over the distance L, the vehicle 52 is now in the parking space 51 of the garage 52, and the driver turns off the storing mode switch 27, which completes the garaging operation in the storing mode.

Thus, in the storing mode, the automatic driving apparatus 1 stores the travelled distance $L_S$, steering position data $X_S$ corresponding to the travelled distance $L_S$, and shift lever position data $P_S$.

When the vehicle 52 is to be put into the parking space of the garage 50 in the automatic driving mode in the example of FIG. 9, the driver first temporarily stops the vehicle 52 close to the predetermined initial position 53 as in the storing mode, then lightly steps on the brake pedal, and sets the shift lever to the same position (e.g., reverse position) as in the storing mode. Then, once the automatic driving mode switch 21 of FIG. 4 is turned on by the driver, the automatic driving mode is activated. In this automatic driving mode, the automatic driving apparatus 1 controls the electric power steering apparatus 31 on the basis of the steering position data $X_S$ corresponding to the travelled distance $L_S$ stored in the storing mode, so that the vehicle 52 is automatically driven to move from the initial position 53 into the garage 50.

FIG. 11 is a flowchart illustrating the garaging operation in the automatic driving mode. First, at step S1, the vehicle 52 is manually driven by the driver until the forward end of the vehicle 52 is brought close to and substantially parallel with the initial position line 53, as in the storing mode. The driver lightly steps on the brake pedal at next step S2 to such a degree that the brake does not actually operate, and sets the shift lever to the same position (e.g., reverse position) as in the storing mode.

Then, at step S4, the driver turns on the automatic driving mode switch 21 of FIG. 21 so that the automatic driving mode is activated. In this automatic driving mode, the vehicle 52 is automatically driven to creep backward, during which time the setting unit 4 of the automatic driving apparatus 1 detects vehicle velocity $V_A$ and steering position $X_A$ corresponding to time elapsed since the beginning of the backward movement (time data $T_A$).

At next step S5, the setting unit 4 calculates automatically travelled distance $L_A$ by multiplying the value of the vehicle velocity $V_A$ by the value of the time data Tτ and determines steering position $X_A$ corresponding to the automatically travelled distance $L_A$. Then, at step S6, standard steering position data $X_S$ corresponding to the automatically travelled distance $L_A$ is read out on the basis of the travelled-distance $L_S$ vs. steering-position $X_S$ data stored in the storing mode.

At next step S7, offset ΔX between the standard steering position data $X_S$ and detected steering position $X_A$ ($X_S$–$X_A$) is calculated so that the electric power steering apparatus 31 is driven in accordance with steering target signal $I_{AS}$ corresponding to the steering position offset ΔX. Thus, the model driving data stored in the storing mode is reproduced to allow the vehicle 52 to be automatically put into the parking space of the garage 50. Finally, at step S8, the driver turns off the automatic driving mode switch 21 to complete the automatic garaging operation.

While the present invention has been described above as garaging the vehicle 52 with the shift lever set to the reverse position, the principle of the invention is also applicable where the shift lever is set to any other position than the reverse position. Because the automatic driving is applied only to the steering operation and the braking operation can be executed as desired by the driver, the vehicle 52 can be freely stopped by the driver's braking operation even in the automatic driving mode, in case there exists an obstacle that was not present in the storing mode.

In summary, the automatic driving apparatus for an automotive vehicle according to the present invention is characterized in that it comprises a storage unit, in response to a storing mode signal for setting a storing mode of the vehicle, for storing as model driving data steering and running states of the vehicle corresponding to the elapsed time since the initiation of the storing mode, and a setting unit, in response to an automatic driving mode signal for setting an automatic driving mode of the vehicle, for comparing the steering and running states stored in the storage unit and steering and running states of the vehicle detected in the automatic driving mode for each predetermined time point so as to set at least one steering state. Thus, in the automatic driving mode, the model driving data stored in the storing mode can be reproduced with the steering system of the vehicle set to an automatically operating state, and the vehicle can be steered automatically in accordance with the reproduced model driving data, so that the automatic driving apparatus achieves highly convenient, efficient and reliable automatic driving with a simple structure, particularly in garaging of the vehicle or parking of the vehicle between narrowly spaced-apart other vehicles in tandem that would otherwise require high-level skill of the vehicle driver.

What is claimed is:

1. An automatic driving apparatus for an automotive vehicle comprising:

a storage unit, in response to a storing model signal for setting a storing mode of the vehicle, for storing as model driving data steering and running states of the vehicle corresponding to elapsed time in the storing mode;

a setting unit, in response to an automatic driving mode signal for setting an automatic driving mode of the vehicle, for comparing the steering and running states stored in said storage unit and steering and running states of the vehicle detected in the automatic driving mode for each predetermined time point, so as to set at least one automatic steering state data to allow the vehicle to be steered automatically in accordance with said model driving data; and an AND section for generating said automatic driving mode signal if vehicle operation signals are consistent with automatic steering.

2. An automatic driving apparatus as defined in claim 1 which further comprises an electric power steering apparatus for controlling steering of the vehicle on the basis of the automatic steering state data supplied by said setting unit.

3. An automatic driving apparatus as defined in claim 1 wherein said storage unit includes a travelled-distance calculating section that is responsive to the storing mode signal for calculating a travelled distance of the vehicle, as said running state, on the basis of a velocity of the vehicle and elapsed time detected in the storing mode, and a steering data storing section for storing a standard steering position or standard steering angle as said steering state in correspondence with the travelled distance calculated by said travelled-distance calculating section.

4. An automatic driving apparatus as defined in claim 3 wherein said setting unit includes an automatically-travelled-distance calculating section responsive to the automatic driving mode signal for calculating an automatically travelled distance of the vehicle on the basis of the velocity and elapsed time, a data accessing section for reading out from said steering data storing section the standard steering position or standard steering angle that corresponds to the automatically travelled distance calculated by said automatically-travelled-distance calculating section, and a steering target signal determining section for determining a steering target signal on the basis of an offset between the standard steering position or standard steering angle read out by said data accessing section and a steering position or steering angle detected in the automatic driving mode, and wherein the electric power steering apparatus in said driving apparatus is driven by the steering target signal determined by said determining section.

5. An automatic driving apparatus as defined in claim 1 wherein said storing mode signal is generated by a storing mode switch for setting the storing mode, and said automatic driving mode signal is generated by the AND section for computing an AND condition among a signal generated by an automatic mode switch for setting the automatic driving mode, a signal indicating that a brake pedal has been stepped on and a signal indicating that there is a match between shift lever positions in the storing and automatic driving modes.

6. An automatic driving apparatus as defined in claim 1 which further comprises a deactivating section for deactivating the automatic driving mode when a vehicle velocity signal from a vehicle velocity sensor, a steering torque signal from a steering torque sensor, or a steering position signal from a steering position sensor or steering angle signal from a steering angle sensor exceeds a predetermined value.

7. An automatic driving apparatus as defined in claim 1 which further comprises a display section responsive to the storing mode signal or automatic driving mode signal for informing various states in the storing or automatic driving mode.

8. An automatic driving apparatus as defined in claim 1 wherein the steering target signal output from said setting unit is supplied to an offset determining section constituting a control unit of said electric power steering apparatus, so as to effect automatic steering in the automatic driving mode on the basis of an offset between said steering target signal and a motor current signal indicative of a current flowing in an electric motor of the vehicle.

* * * * *